United States Patent [19]

Farrissey, Jr. et al.

[11] 3,870,674

[45] Mar. 11, 1975

[54] PARTICULATE POLYIMIDE COMPOSITIONS CONTAINING PHENAL OR DIPOLAR APROTIC SOLVENTS

[75] Inventors: William J. Farrissey, Jr.; Karl W. Rausch, Jr., both of New Haven, Conn.

[73] Assignee: The Upjohn Company, Kalamazoo, Mich.

[22] Filed: Jan. 16, 1974

[21] Appl. No.: 433,809

[52] U.S. Cl. ....... 260/30.2, 117/100 C, 260/30.6 R, 260/30.8 DS, 260/32.6 NT, 260/33.4 P
[51] Int. Cl... C08g 51/44, C08g 51/34, C08g 51/46
[58] Field of Search .... 260/30.2, 32.6 NT, 30.8 DS, 260/33.4 P, 65, 78 TF

[56] References Cited
UNITED STATES PATENTS

| | | | |
|---|---|---|---|
| 2,929,800 | 3/1960 | Hill | 260/32.6 NR |
| 3,446,771 | 5/1969 | Matsubayashi | 260/32.6 NR |
| 3,493,540 | 2/1970 | Muller | 260/33.4 P |
| 3,499,858 | 3/1970 | Strassel | 260/30.8 DS |
| 3,562,189 | 2/1971 | Farrissey | 260/30.8 DS |
| 3,666,709 | 5/1972 | Suzuki | 260/33.4 P |
| 3,673,145 | 6/1972 | Minami | 260/33.4 P |
| 3,708,458 | 1/1973 | Alberino | 260/63 N |
| 3,773,701 | 11/1973 | Loew | 260/30.8 DS |
| 3,781,240 | 12/1973 | Lubowitz | 260/37 NT |
| 3,787,367 | 1/1974 | Farrissey | 260/65 |
| 3,794,611 | 2/1974 | Brice | 260/33.6 AQ |

*Primary Examiner*—Harry Wong, Jr.
*Assistant Examiner*—Paul R. Michl
*Attorney, Agent, or Firm*—Denis A. Firth; John Kekich

[57] ABSTRACT

A solid polyimide composition is described with a softening point reduced to the range of about 50°C to about 150°C to facilitate molding and particularly extrusion. The composition comprises a blend of (a) a selected copolyimide and (b) a dipolar aprotic solvent or phenol having a boiling point ≥ 50°C higher than the softening point of the blend but not higher than about 225°C. The copolyimides are those characterized by solubility in organic polar solvents and by thermoplasticity.

7 Claims, No Drawings

PARTICULATE POLYIMIDE COMPOSITIONS CONTAINING PHENAL OR DIPOLAR APROTIC SOLVENTS

BACKGROUND OF THE INVENTION

1. Field of the Invention

The present invention relates to novel polymer compositions and is more particularly concerned with solid, extrudable polyimide compositions of reduced softening point and with processes for their preparation.

2. Description of the Prior Art

Polyimides which are thermoplastic and can be molded in "chemically finished" form have recently been described; see, for example, U.S. Pat. No. 3,708,458. By "chemically finished" polyimide is meant a polymer which has already been fully polymerized and completely converted to polyimide. In contrast, many polyimides cannot be molded in the form of the final polyimide and have to be molded at an intermediate stage which requires further treatment after molding to convert to polyimide. A second group of "chemically finished" thermoplastic copolyimides are disclosed in copending application Ser. No. 310,398, now U.S. Pat. No. 3,787,367, filed Nov. 29, 1972 in the names of Philip S. Andrews and William J. Farrissey, Jr.

While these copolyimides have sufficient thermoplasticity to be molded under appropriate heat and pressure conditions they possess relatively high softening points and are not capable of being extruded. We have now found that the above copolyimides can be converted to a form having good melt flow characteristics at moderate temperatures. This finding makes it possible to extrude these materials in a variety of forms as well as greatly facilitating the compression molding, transfer molding and injection molding of the materials by reducing the operating temperatures required for these procedures.

SUMMARY OF THE INVENTION

This invention comprises a solid polyimide composition having a softening point in the range of about 50°C to about 150°C and comprising a blend of:

a. from about 85 percent to about 65 percent by weight of a linear thermoplastic copolyimide selected from the class consisting of i. a copolyimide characterized by the recurring unit

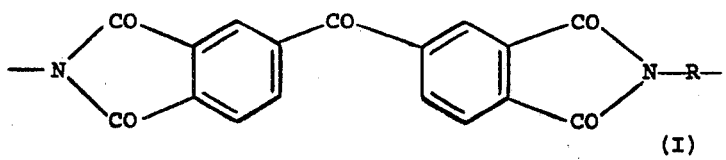

(I)

wherein from 10 to 30 percent of said units (I) are those in which R represents

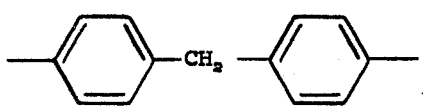

and the remainder of said units are those in which R represents a member selected from the group consisting of

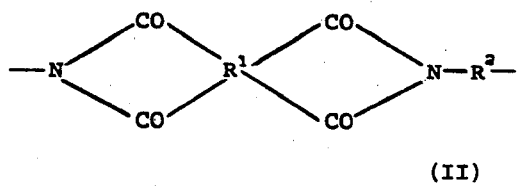

and mixtures thereof; and ii. a copolyimide characterized by the recurring unit

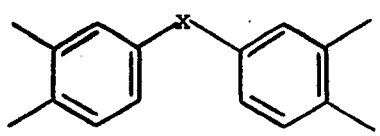

(II)

wherein, in 75 to 100 percent of said recurring units $R^1$ represents

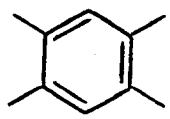

and, in the remaining 0 to 25 percent of said units, $R^1$ represents

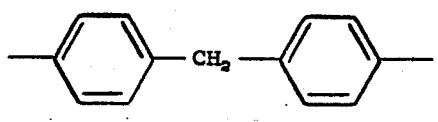

wherein X is a member selected from the group consisting of CO, O and $SO_2$; and wherein, in 10 to 35 percent of said recurring units, $R^2$ represents

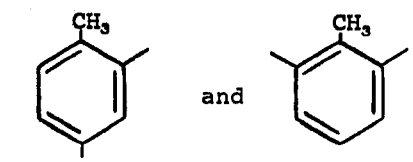

and, in the remaining 65 to 90 percent of said units, $R^2$ represents a member selected from the group consisting of

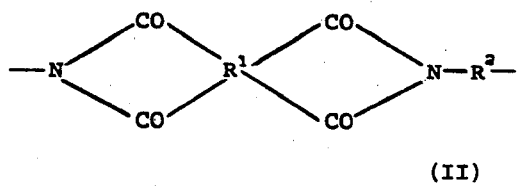

and mixtures thereof; and b. from about 15 percent to about 35 percent by weight of a member of the class consisting of dipolar aprotic solvents and phenols each having a boiling point which is at least 50°C higher than that of the softening point of said blend and is not higher than 225°C.

The term "softening point" as used throughout the specification and claims means the temperature at which the polyimide composition, in the form of a molded test piece, permits penetration with a loaded probe under standard conditions of determination. The softening points of the polyimide compositions of the invention were all determined by heating a molded test piece at the rate of 5°C per minute in a Thermal Mechanical Analyzer (DuPont Model 900 Thermal Analyzer with a 941 TMA module) and observing the temperature (in °C) at which the probe of the instrument, with a 20g. load, first penetrated the surface of the test specimen.

The softening point of the compositions of the invention is not to be confused with the "fusion temperature." The latter temperature is that at which a composition of the invention in particulate form will flow under pressure and fuse to form a solid molding. The fusion temperature of any particular composition of the invention is generally a few degrees Centigrade lower than the softening point.

The polyimide compositions of the invention are especially adapted for use in the molding, by compression, transfer, and injection molding techniques, or by extrusion, of shaped polyimide articles. The latter are characterized by high structural strength, high resistance to deformation by heat and are accordingly useful in a wide variety of applications well-known in the art.

DETAILED DESCRIPTION OF THE INVENTION

The copolyimides having the recurring units (I) or (II) above, wherein R, $R_1$ and $R_2$ are as hereinbefore defined, are characterized by their solubility in organic dipolar aprotic solvents and by their thermoplasticity, i.e. unlike most polyimides heretofore known they can be molded relatively easily and exhibit good flowability under pressure molding conditions.

The copolyimides having the recurring unit (I), and methods for their preparation, are described in U.S. Pat. No. 3,708,458. The copolyimides having the recurring unit (II), and methods for their preparation, are disclosed in copending application Ser. No. 310,398 filed Nov. 29, 1972 in the name of Philip S. Andrews and William J. Farrissey, Jr. The disclosure of said copending application is hereby incorporated in its entirety into this application. Briefly, said copolyimides having the recurring unit (II) are obtained by reacting the appropriate polycarboxylic anhydride or mixture of anhydrides in appropriate proportions, with the appropriate molar proportions of either (i) a mixture of 4,4'-methylenebis(phenyl isocyanate) and toluene diisocyanate (2,4-isomer or 2,6-isomer or mixtures thereof) or (ii) a mixture of 4,4'-methylenebisaniline and toluenediamine (2,4-isomer or 2,6-isomer or mixtures thereof) under the conditions described in the aforesaid U.S. Pat. No. 3,708,458.

The copolyimides having recurring units (I) and (II) have glass transition points in the neighborhood of about 310°C. This means that the materials can be molded by compression molding techniques at or above these temperatures They show good flowability in the mold but the need to use such high temperatures is a disadvantage. Further it is not possible to extrude the materials, for example in the form of films, because the viscosity of the molten polyimide is too high at convenient working temperatures.

We have now found that the softening point of the copolyimides having recurring units (I) and (II) can be dramatically reduced, and the ease of processability correspondingly increased, in a simple but elegant manner without affecting the desirable structural strength properties of the ultimate shaped polyimide.

Thus we have found that, by incorporating into the said copolyimides a minor amount of certain dipolar aprotic solvents or certain phenols it is possible to obtain a product which is still solid, and free-flowing in the comminuted solid state, but which has a dramatically lower softening point than the starting copolyimide. Thus, depending upon the nature and amount of the aprotic solvent or phenol which is used, it is possible to produce copolyimide compositions having softening points in the range of about 50°C to about 150°C. These compositions can be readily molded or shaped without the need to resort to the high temperature molding conditions required with the polyimides themselves. Further the above compositions can be extruded, using conventional extrusion techniques, in the form of films, tubes, rods and the like. This is in marked contrast to the starting copolyimides themselves which cannot be extruded at practical working temperatures.

Finally, it has been found that, after the compositions of the invention have been shaped, molded, or extruded, the dipolar aprotic solvent or phenol can be removed therefrom by volatilization to leave a polyimide article having the same desirable high structural strength and heat resistance as the original copolyimide from which the composition of the invention was prepared.

The dipolar aprotic solvents which are employed in making the compositions of the invention are a well-know class of solvents which are inclusive of dimethyl sulfoxide, dimethylacetamide, hexamethylphosphoramide, N-methyl-2-pyrrolidone, N-ethyl-2-pyrrolidone, N-vinyl-2-pyrrolidone, tetramethylurea, pyridine, and the like.

The phenols which are employed in making the compositions of the invention are monohydric phenols having a boiling point less than about 225°C. Illustrative of such phenols are phenol itself, o-cresol, m-cresol, p-cresol, guaiacol, mesitol, the various isomeric xylenols, and the like including mixtures of two or more phenols. The latter mixtures include the phenolic mixtures commercially available as cresylic acids.

The particular dipolar aprotic solvent or phenol chosen for a given composition is governed by the desired softening point and by the boiling point of the solvent (i.e., dipolar aprotic solvent or phenol) in question. Thus it is found advantageous to employ a solvent which has a boiling point at least about 50°C higher than the softening point of the polyimide composition in which it is employed. In turn, the softening point of the composition is a function of the proportion of solvent present therein. In general there is a straight line relationship between the softening point and the amount of solvent employed in a given composition. The particular relationship for any given combination of polyimide and solvent can be determined readily by experimentation. The solvent is normally present as the minor amount by weight of the polyimide compositions of the invention and is generally present in an amount representing about 15 percent to about 35 percent by weight.

The compositions of the invention are made by blending the components thereof together using appropriate blending means. An exotherm occurs when the blending is carried out. Advantageously, the dipolar aprotic solvent or phenol is added portionwise to the copolyimide with vigorous agitation and cooling if necessary. In a preferred embodiment the dipolar aprotic solvent or phenol is dissolved in, or diluted with, a lower boiling solvent such as acetone, methanol, methylene chloride, diethyl ether, methyl ethyl ketone and the like, which can be removed readily from the resulting polyimide composition by evaporation. In such an embodiment the amount of lower boiling solvent employed is advantageously at least equal in volume to the amount of dipolar aprotic solvent or phenol employed. Preferably the lower boiling solvent is employed in amounts up to about 10 times by volume of the dipolar aprotic solvent or phenol.

After the blending is complete, the lower boiling solvent (if any) is caused or allowed to evaporate, at elevated temperature if desired. The resulting polyimide composition which remains is a free-flowing particulate solid having a softening point in the range of about 50°C to about 150°C. This material can be employed in a variety of ways. In particular this material can be extruded in the form of any desired shape including particularly a continuous film. The latter is an accomplishment which has hitherto been difficult or impossible with a "chemically finished" polyimide and represents one highly useful end result of the present invention.

The compositions of the invention can also be used in a variety of molding applications. For example, they can be compression molded in the same manner as the starting copolyimides with the advantage that the molding can be accomplished at much lower operating temperatures. In addition, the copolyimide compositions of the invention can be admixed with fillers such as glass microspheres, microballons, chopped fiberglass, fiberglass mat, and the like, and then molded in the form of composites, laminates and the like, in the same manner as can the starting copolyimides except that lower operating temperatures can be employed.

In all of the above operations the molded article or film is subjected, in a final step, to curing at elevated temperature to remove the dipolar aprotic solvent or phenol component of the composition. This step is accomplished readily without any change in appearance or damage to the molded article or film. Advantageously the molded article or film is subjected to a gradually rising temperature which begins about 100°C below, and finally exceeds, the boiling point of the dipolar aprotic solvent or phenol.

In this manner rapid boiling of solvent from the molded article or film is avoided and there is no tendency for the appearance of the molded surface to be marred.

Further it is found that the physical properties and structural strength properties of the copolyimide articles or films so molded correspond very closely to those of the starting copolyimide. Accordingly, it will be seen that the process and compositions of the invention represent a significant contribution to the art of molding "chemically finished" polyimides.

The following examples describe the manner and process of making and using the invention and set forth the best mode contemplated by the inventors of carrying out the invention but are not to be construed as limiting.

EXAMPLE 1

The copolyimide employed in the following example was a copolyimide prepared by reacting 3,3', 4,4'-benzophenonetetracarboxylic acid dianhydride with a stoichiometric amount of a mixture containing 80 molar percent of toluene diisocyanate and 20 molar percent of 4,4'- methylenebis (phenyl isocyanate) using the procedure set forth in Example 4 of U.S. Pat. No. 3,708,458.

An aliquot of 100 g. of the above copolyimide was placed in a beaker and a mixture of 50 g. of N-methylpyrrolidone and 100 g. of methylene chloride was added thereto slowly with agitation. The resulting blend was poured into an open dish and the methylene chloride was allowed to evaporate. The resulting solid residue was a free flowing, off-white, powdery material containing 66.66 percent of copolyimide and 33.33 percent of N-methylpyrrolidone. This material (blend A) was found to have a softening point of 75°C, as measured using the Thermal Mechanical Analyzer procedure cited above.

Using the above procedure a series of blends of the above copolyimide and N-methylpyrrolidone were prepared having the following compositions and softening points.

| Blend | % W/W Copolyimide | Softening Point |
|---|---|---|
| B | 74.2 | 110°C |
| C | 80 | 130°C |

EXAMPLE 2

Using the procedure described in Example 1 a blend was prepared using the following ingredients.

30 g. of the copolyimide of Example 1
15 g. of N-vinylpyrrolidone
30 g. of acetone The acetone was evaporated from the mixture as described in Example 1 and the residual solid was a free flowing power containing 66.66% w/w copolyimide having a softening point of about 60°C.

Example 3

Using the procedure described in Example 1, a blend was prepared using the following ingredients.

30 g. of the copolyimide of Example 1
15 g. of m-cresol
30 g. of acetone

After evaporation of the acetone there remained a free flowing powder containing 66.66% w/w copolyimide and having a softening point of about 70° to 75°C.

Similarly, using the above procedure, but replacing the m-cresol by an equal weight of phenol, p-cresol or guaiacol, there are obtained copolyimide compositions of the invention in the form of free flowing powders containing 66.66% w/w of copolyimide.

EXAMPLE 4

A copolyimide was prepared using the following procedure. To a solution of 87.25 g. (0.4 mole) of pyromellitic dianhydride in 750 ml. of N-methylpyrrolidone (solution previously dried by azeotropic distillation) at 80°C was added, slowly with stirring over a 4.5 hr. period, a mixture of 55.7 g. (0.32 mole) of 2,4-toluenediisocyanate and 20.0 g. (0.08 mole) of methylenebis(phenyl isocyanate). After the addition was complete the mixture was stirred for another 0.5 hr. at 80°C and 100 ml. of N-methylpyrrolidone was added to reduce viscosity. A second additional 100 ml. portion of N-methylpyrrolidone was added after a further 0.5 hr. at 80°C and stirring was continued at this temperature for a further 0.5 hr. before allowing the reaction mixture to cool to room temperature. The mixture so obtained was extruded hot (80°C) as strands into warm water (72°C). The resulting solidified rope-like strands were washed with hot water for 2 hours and then collected, comminuted in a Waring Blender and dried in vacuo. There was thus obtained a copolyimide characterized by a recurring unit of the formula:

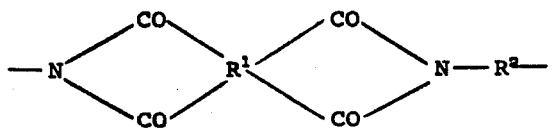

wherein $R^1$ represents

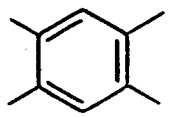

and wherein $R^2$, in 20 percent of said units, represents

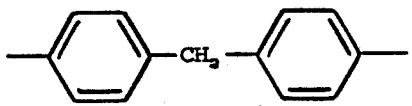

and in the remaining 80 percent of said units, represents

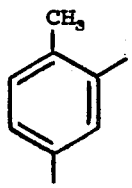

A polyimide blend of the invention was prepared using the procedure described in Example 1, Blend A, but replacing the copolyimide there used by an equal amount by weight of the copolyimide prepared as described above. There was thus obtained a free flowing power containing 66.66% w/w of the above copolyimide.

EXAMPLE 5

A copolyimide N-methylpyrrolidone blend prepared as described in Example 1, Blend A, was blended with 1% Irganox 1076 (antioxidant; Geigy Industrial Chemicals) and then extruded as a film using the following technique.

The extruder used was a Brabender (type PL-V150 drive with Type 2501 control and Type 2523 Extruder) with a die set to extrude a film of width 4 inches and thickness 35–37 mils. The temperature at the feed port was 140° C and that at the die was 130° C with an approximately linear gradient of temperature between these two points. The extruder screw was run at a speed of 50 rpm. The extruded material leaving the die was fed directly to calender rolls heated at 75° C and having a roll gap of 2 mils. There was obtained a film of width approximately 4 inches and thickness 11–12 mils. This film was subsequently heated slowly to approximately 250°C (maximum) over a period of 5 hours (2 hours at 150°C, 2 hours at 200°C and 1 hour at 250°C) to remove N-methylpyrrolidone. The resulting film was of good appearance, uniform thickness and showed no damage due to removal of solvent. A specimen of the film was found to have tensile strength of 13,700 psi (ASTM 638-68), a tensile modulus of 295,000 psi (ASTM 638-8), and % elongation at break of 7.6.

EXAMPLE 6

An aliquot of 10 g. of the copolyimide blend A prepared as described in Example 1 was intimately mixed by manual blending with 25 g. of glass microballons (Eccospheres FT-102; Emerson and Cunning: average diameter 90 microns). The resulting mixture was placed in a steel cylindrical mold (2 inches diameter) and molded at a pressure of 330 psi for 10 minutes. The preform so obtained was carefully removed from the mold and placed on a sheet of fiberglass cloth in an oven at 80°C. The temperature of the oven was maintained thereat for 2 hours, then raised to 110°C for 2 hours and finally to 140°C for 2 hours. Thereafter the molding was heated in a furnace at 320°C for 4 hours. The resulting syntactic foam contained 80% by weight of microsphers.

EXAMPLE 7

A resin blend prepared as described in Example 1, Blend C, was charged to a steel mold consisting of a ring (5 inches O.D. and 3 inches I.D.) and two opposing circular forces (3 inches diameter). The mold and powder were put into a hydraulic press which had been preheated to 135°C. A contact pressure of less than 200 psi was applied to the mold forces. When the mold temperature had increased to 110°C, the mold pressure was raised to 2,500 psi. After 5 minutes the heaters in the press were turned off and the platens allowed to cool. When the mold temperature fell to 90°C, the molded resin disc was removed. The molded polyimide so obtained was found to have tensile strength of 13,800 psi, a tensile modulus of 288,000 psi and % elongation at break of 6.2.

EXAMPLE 8

Using the procedure described in Example 1, Blend A, but replacing the N-methylpyrrolidone by an equal weight of dimethylacetamide, hexamethylphosphoramide, tetramethylurea or pyridine, there are obtained copolyimide blends of the invention in the form of solid, free flowing powders.

EXAMPLE 9

To obtain further data on the relationship of softening point to solvent concentration in typical blends according to the invention, films of about 5-10 mils thickness were cast using a 20% w/w solution in N-methylpyrrolidone of the copolyimide used as starting material in Example 1. When dried at 80°C to the stage where the film was self-supporting (about 25% solvent content) small samples were cut from the film and measured for solvent content in the Thermal Gravimetric Analysis (TGA) Module of the DuPont 900 Thermal Analyzer and for softening point in the Thermal Mechanical Analysis (TMA) Module. The films were further dried in an oven at 100°C to obtain lower solvent concentrations at which TGA and TMA were simultaneously run. This was continued for longer intervals at higher temperatures (up to 150°C) until the solvent content was reduced to about 7%. The following data was recorded.

| Sample | % N-methylpyrrolidone found | Softening point |
|---|---|---|
| 1 | 22 | 123°C |
| 2 | 18 | 135°C |
| 3 | 15.5 | 153°C |
| 4 | 13.5 | 168°C |
| 5 | 6.7 | 213°C |

We claim:
1. A solid particulate, non-cellular, polyimide composition having a softening point in the range of about 50°C to about 150°C and comprising a blend of
   a. from about 85 percent to about 65 percent by weight of a copolyimide selected from the class consisting of
   i. a copolyimide characterized by the recurring unit

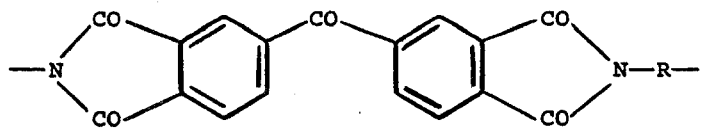

(I)

wherein from 10 to 30 percent of said recurring units are those in which R represents

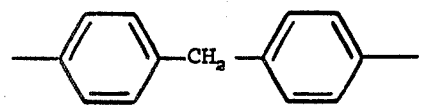

and the remainder of said units are those in which R represents a member selected from the group consisting of

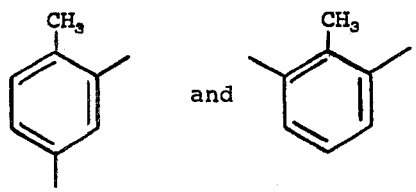

and mixtures thereof; and
   ii. a copolyimide characterized by the recurring unit

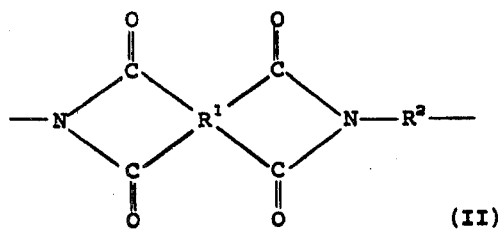

(II)

wherein, in 75 to 100 percent of said recurring units $R^1$ represents

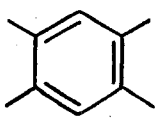

and, in the remaining 0 to 25 percent of said units, $R^1$ represents

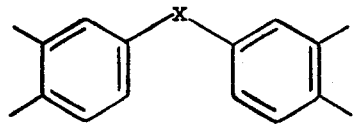

where X is a member selected from the group consisting of CO, O and $SO_2$; and wherein, in 10 to 35 percent of said recurring units, $R^2$ represents

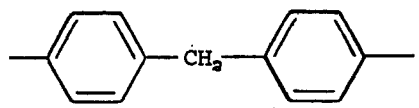

and, in the remaining 65 to 90 percent of said units, $R^2$ represents a member selected from the group consisting of

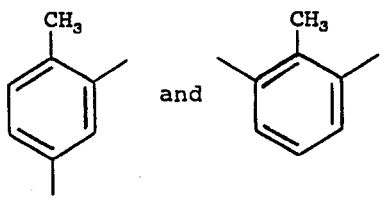

and mixtures thereof; and
   b. from about 15 percent to about 35 percent by weight of at least one member of the class consisting of dipolar aprotic solvents and phenols each having a boiling point which is at least 50°C higher than that of the softening point of said blend and is not higher than about 225°C.

2. A solid copolyimide composition according to claim 1 wherein the copolyimide is characterized by the recurring unit (I) wherein approximately 20 percent of said recurring units are those in which R represents

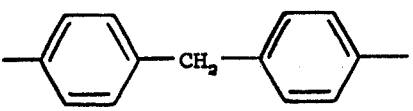

and the remainder of said units are those in which R represents a member selected from the group consisting of

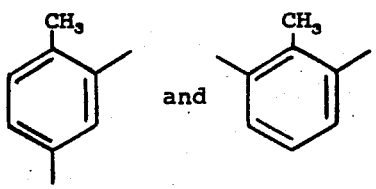

and mixtures thereof.

3. A solid copolyimide composition according to claim 1 wherein the copolyimide is characterized by the recurring unit (II) wherein $R^1$ represents

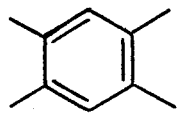

and wherein $R^2$, in 20 percent of said units, represents

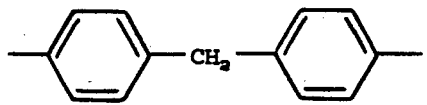

and, in the remaining 80 percent of said units, represents

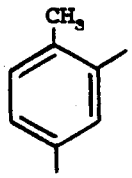

4. A solid copolyimide composition according to claim 1 wherein the dipolar aprotic solvent is N-methylpyrrolidone.

5. A solid copolyimide composition according to claim 1 wherein the dipolar aprotic solvent is N-vinylpyrrolidone.

6. A solid copolyimide composition according to claim 1 wherein the phenol is m-cresol.

7. A solid particulate, non-cellular, copolyimide composition comprising a blend of
   a. from about 85 percent to about 65 percent by weight of a copolyimide characterized by the recurring unit

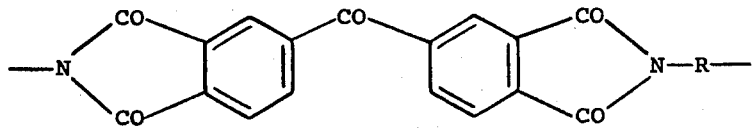

wherein approximately 20 percent of said recurring units are those in which R represents

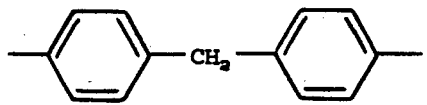

and the remainder of said units are those in which R represents a member selected from the group consisting of

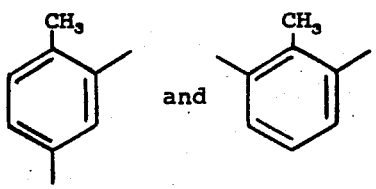

and mixtures thereof; and
   b. from about 15 percent to about 35 percent by weight of N-methylpyrrolidone.

* * * * *

UNITED STATES PATENT OFFICE
CERTIFICATE OF CORRECTION

Patent No. 3,870,674      Dated March 11, 1974

Inventor(s) William J. Farrissey, Jr. and Karl W. Rausch, Jr.

It is certified that error appears in the above-identified patent and that said Letters Patent are hereby corrected as shown below:

| Column 3, Line 20: | Should read: |
|---|---|
| Centigrade lower | Centigrade higher |

Signed and sealed this 6th day of May 1975.

(SEAL)
Attest:

RUTH C. MASON
Attesting Officer

C. MARSHALL DANN
Commissioner of Patents
and Trademarks